Aug. 18, 1931.  H. I. PIATT  1,819,620

THERMOELECTRIC CONTROL FOR HEATERS

Filed Aug. 13, 1928

Witness:
Geo. T. Davison

Inventor:
Howard I. Piatt
By Cromwell, Greist & Warden
Attys

Patented Aug. 18, 1931

1,819,620

UNITED STATES PATENT OFFICE

HOWARD I. PIATT, OF LANSING, MICHIGAN, ASSIGNOR TO MOTOR WHEEL CORPORATION, OF LANSING, MICHIGAN, A CORPORATION OF MICHIGAN

THERMOELECTRIC CONTROL FOR HEATERS

Application filed August 13, 1928. Serial No. 299,150.

This invention relates to thermoelectric control for heaters and it has among its objects the provision of an improved thermostatic fuel feed control in heaters utilizing fluid fuel, although in its broad aspects the invention is not restricted to a particular type of fuel feed systems.

Figure 1:
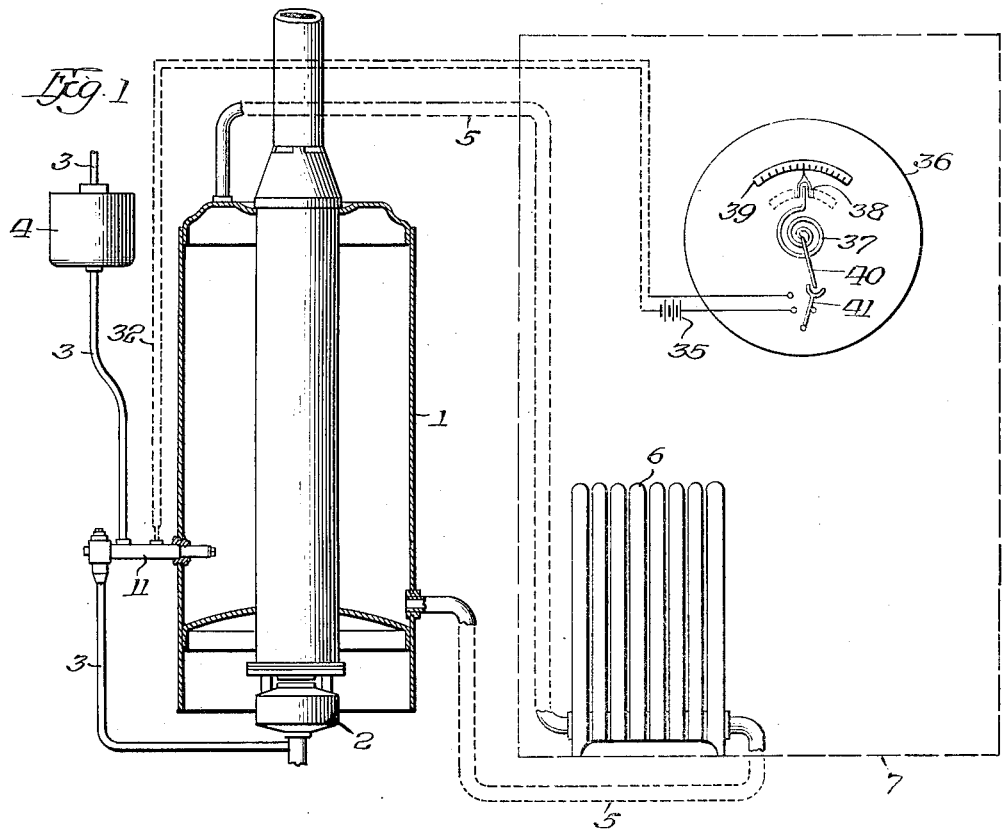
Figure 2:
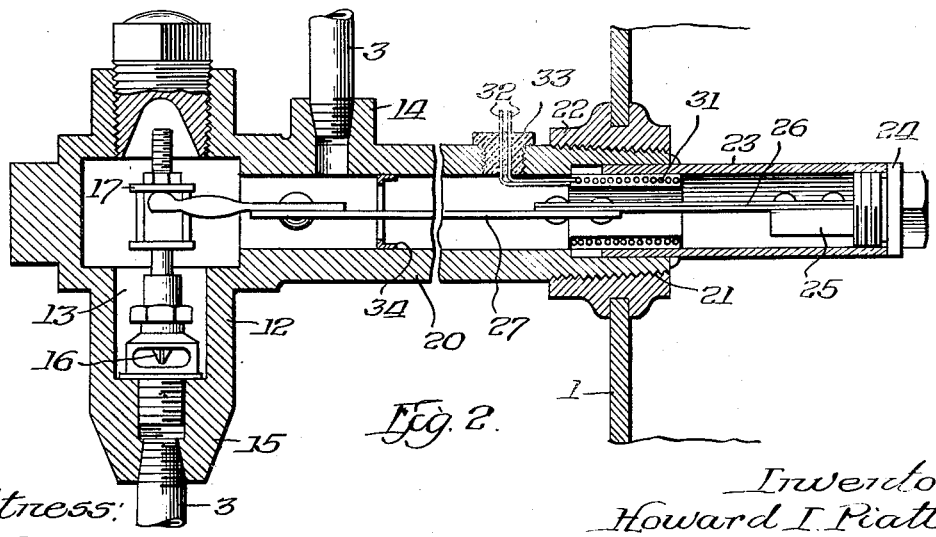

The invention will be best understood from the following description of an exemplification thereof, reference being had to the accompanying drawings, wherein Fig. 1 is a diagrammatic view illustrating a heater system embodying the invention; and Fig. 2 is a sectional view of the fuel control valve of Fig. 1.

The present invention is designed for operation in heater systems such as described in my co-pending application, Serial No. 237,957 (case No. 7092) filed December 5, 1927, but it is also useful in other systems and other applications. Such heater system is shown in Fig. 1, and includes, in general, a water boiler or heater 1 in which water is heated by means of an oil burner 2 to which fuel is supplied from a fuel feed line 3 leading from a main oil reservoir not shown in the drawings. A head control chamber 4 is interposed in the fuel feed line so as to maintain a constant level and pressure head of the fuel flowing to the burner. The heated water from the boiler is circulated by means of a suitable pipe system 5 through a heating apparatus such as radiators 6 disposed in the spaces that are to be heated, a dotted-line rectangle 7 being intended to indicate the heated space such as a room or a house located remotely or spaced from the heater 1.

In my last identified application there is described a fuel feed control system including two valves disposed in the fuel line leading to the burner, one valve being responsive to the local conditions in the heater to regulate the fuel flow so as to maintain the temperature of the boiler water or the heating medium within a predetermined range, while the other valve is remotely controlled from the room that is to be heated so as to maintain the temperature of said room at a predeterminedly adjustable value.

According to the present invention I secure the double control of the fuel feed to the burner by the local temperature of the heating medium and by the remote temperature of the heated space by means of a single valve 11 illustrated in detail in Fig. 2. The valve comprises a valve casing 12 having a main valve chamber 13 provided with an inlet port 14 and an outlet port 15 to which the fuel feed line 3 is connected. Within the valve chamber 13 is mounted a needle valve 16 such as described in my last mentioned application. The stem of the needle valve 16 has a collar 17 by means of which the valve may be lifted to open the fuel flow from the inlet port to the outlet port, or moved downwardly and released to reduce or stop the fuel flow.

The valve casing 12 is provided with a lateral extension 20 having at its end a threaded section 21 by means of which it may be threaded into a flange 22 at an opening in the valve of the heater 1. The open end of the valve extension 20 is closed by a thermostat casing in the form of a short pipe 23 having one end open and communicating with the interior of the extension 20, and another end closed by a removable threaded plug 24. The inner side of the plug 24 has a projection 25 to which is secured one end of a bimetallic strip 26 constituting the thermostat element of the valve. The other free end of the bimetallic strip 26 has secured thereto an extension arm 27 which engages the collar 17 so as to transmit the upward and downward movement of the bimetallic strip 26 to the stem of the needle valve 16, thereby controlling the opening thereof. Adjacent and preferably surrounding the free end of the thermostat strip 26 within the thermostat chamber formed in the casing 23 there is also mounted a heating element in the form of a heating coil 31 to which current may be supplied by means of leads 32 extending through the walls of the valve casing. The leads 32 are so secured in the wall casing as to prevent leakage of oil. This may be effected by molding the lead wires into a suitable insulating plug 33 of a material such as bakelite, and securing the plug within a perforation in the casing 20. Any other suitable construction may be adopted and, if desired, one of the leads may be grounded to the casing and connection thereto established through contact with the casing.

A partition or baffle 34 is inserted within the opening in the extension 20 so as to separate the chamber surrounding the thermostat 26 from the part of the valve chamber in which oil is flowing to the outlet port. In this way more uniform temperature conditions, unaffected by changes in temperature of the oil flowing through the valve casing will be maintained adjacent the thermostat strip 26. The baffle 34 is provided with a suitable slot to permit free and unobstructed movement of the extension arm 27 to close and open the valve 16.

The extension of the casing 20 is so arranged that the chamber surrounding the bimetallic strip 26 is disposed outside of the path of the flow of the fluid fuel from the inlet port to the outlet port. In this way the body of oil which fills the entire space communicating with the interior of the valve chamber 13 will remain stationary in the proximity of the thermostat strip 26 and have the temperature of the surounding space.

As seen in the drawings, the thermostat casing 23 projects into the interior of the boiler 1 and the walls of that portion of the thermostat casing are directly exposed to the heating medium. Accordingly, the temperature of the medium will be readily communicated through the walls of the thermostat casing and the plug 24 to the adjacent portion of the bimetalic strip 26, thereby controlling the deflection of the latter and therethrough the position of the needle valve 16. If the temperature of the water in the boiler 1 rises above a predetermined value, as determined by the characteristics and the setting of the bimetallic strip 26, the strip will turn downwardly reducing the valve opening and cutting down the fuel flow so as to reduce the heat generated by the burner.

On the other hand, if the water temperature tends to drop below the predetermined value, the bimetallic strip will curl upwardly to open the valve and increase the fuel flow. On this control action of the valve by the temperature conditions of the water constituting the heating medium in the boiler there is superposed an additional control by the temperature in the room that is heated by the heating medium. This second control is effected by means of the aforementioned heater coil 31 the two leads 32 of which are arranged to be energized from a suitable supply source, such as a battery 35, by a remote control instrument 36 disposed in the room the temperature of which is to be controlled. The remote control instrument 36 may be of any desired type and arranged to either continuously or stepwise vary the heating current supplied to the heating coil 31 so as to exercise on the thermostat strip 26 an additional remote control action determined by the temperature of the room 7.

In the form of the invention illustrated in the drawings, the control instrument 36 is shown as a thermostat including a bi-metallic spiral 37 having its outer end held by a clamping member 38 adjustably fixed opposite a point on a cooperating temperature scale 39 at which the room temperature is desired to be maintained. The inner end of the spiral 37 is connected to a rotatably mounted shaft carrying an actuating arm 40 by means of which a switch 41 may be thrown either to the right or the left to control the energization of the heater coil 31 of the fuel valve. For any predetermined setting of the clamping member 38 of the room thermostat 36 a rise of the temperature above the desired value will cause the spiral to throw the switch 41 to the left, closing the energizing circuit for the heater coil 31. This sends sufficient current to the coil to generate in proximity of the free end of the bimetallic strip 26 so much heat as to cause the strip 26 to turn downwardly and entirely close the valve 16, thereby interrupting the fuel flow to the burner. If the temperature in the room drops below the desired value the spiral 37 will throw the switch 41 to the right, opening the energizing circuit of the heater coil 31. This reduces the temperature in the neighborhood of the valve thermostat 26 and restores its control action by the temperature of the heating medium in the boiler adjacent the submerged end of the thermostat casing 23.

With the foregoing arrangement I have thus a double control action of the opening of the valve, a local or basic action by the temperature of the heating medium which acts continuously and produces a continuous regulation of the valve opening and of the fuel flow, and a secondary or superposed control action by the temperature of the room to be heated. The latter action is stepwise and either produces closure of the valve, cutting out the continuous regulating action of the medium surrounding the fixed portion of the valve thermostat, or restores the regulating action of said medium.

The temperature ranges of the local regulating action of the heating medium and of the remote control action of the room thermostat 36 are so chosen that, under no conditions, can the boiler temperature exceed a maximum value that might be dangerous to the boiler. With this in view, the valve thermostat strip 26 has such characteristics and is so set that it prevents fuel flow to the burner if the temperature of the heating medium within the heater exceeds a predetermined maximum safe value. This maximum value of the heating medium is so chosen with relation to the range of the temperatures desired to be maintained in the room that is to be heated as to permit heating of the room by the circulating heating medium to a temperature that is at least equal to the maximum temperature that is desired to be maintained in the room. It is the function of the room thermostat 36 to maintain in the room any desired lower temperature by intermittent or, if desired, continuous, additional control of the fuel flow so as to maintain the room temperature at the desired value below its maximum as determined by the maximum temperature of the heating medium.

The invention is not limited to the details of construction and arrangements described and illustrated hereinabove, but many modifications thereof will suggest themselves to those skilled in the art. It is accordingly desired that the appended claims be given a broad construction commensurate with the scope of the invention within the art.

I claim:

1. In a fluid fuel heater control system, a valve, a thermostatic element exposed to surroundings the temperature of which is to be controlled, a mechanical operating connection between the thermostatic element and the valve, and means for electrically super-imposing upon the thermostatic element an additional temperature variation independent of the temperature of the surroundings thereof.

2. In a fluid fuel heater control system, a fluid flow control valve, a thermostatic element exposed to the temperature within the heater which is to be controlled, a mechanical operating connection between the thermostatic element and the valve for opening and closing the same by the action of the thermostatic element, means for electrically generating in proximity of said thermostatic element heat to exercise thereon a control action supplemental to the control action of the temperature within the heater, and an independent control for the electrical generating means responsive to the temperature of surroundings remote from the heater.

3. In combination with a fluid fuel heater having a heated space, a fluid fuel control valve for said heater comprising a valve casing having a fuel inlet and outlet port, a thermostat casing extending from said valve casing, said thermostat casing projecting through the walls of said heater into the heated space to be influenced by the temperature thereof, a valve member in said valve casing for controlling the fuel flow therethrough, a thermostat in said thermostat casing actuated for mechanical movement by the temperature of the surroundings thereof, a mechanical operating connection between the thermostat and valve for controlling the movement of said valve member in response to the movement of said thermostat, and electrical means for generating in proximity to said thermostat heat independently of the temperature of the heated space surrounding said thermostat casing.

4. The combination with a fuel fluid heater having a heated space, a fuel feed valve comprising a valve casing having an inlet and outlet port, a valve member movable in said casing for closing and opening the fuel flow, a thermostat casing communicating with said valve casing, said thermostat casing projecting into the heated space of said heater, a thermostat element in said thermostat casing, a mechanical connection between said thermostat and said valve member for controlling the opening of said valve in response to the movement of said thermostat element, an electrical heater element associated with said thermostat element for varying the temperature thereof independently of the temperature of the surrounding space, and control means for said heater element responsive to the temperature of surroundings remote from the heater.

5. The combination with a fluid fuel heater having a heated space, a fuel feed valve comprising a valve casing having an inlet and outlet port, a valve member movable in said casing for closing and opening the fuel flow, a thermostat casing communicating with said valve casing, said thermostat casing projecting into the heated space of said heater, a thermostat element in said thermostat casing, a mechanical connection between said thermostat and said valve member for controlling the opening of said valve in response to the movement of said thermostat element, an electrical heater element associated with said thermostat element for varying the temperature thereof independently of the temperature of the surrounding space, and a remotely disposed thermostat for controlling the energization of said heater element.

6. The combination with a fluid fuel heater having a heated space, of a fuel control valve having a valve casing and a valve member movable between open and closed position in said valve casing for controlling the fuel control to said heater, a thermostat element exposed to the temperature in said heated space, a mechanical connection between said thermostat element and said valve member for continuously regulating the position thereof to vary the fuel flow in response to the temperature of the heated space, an electric heater associated with the thermostat, and a remotely positioned thermostat responsive to temperature conditions distinct from the heated space of said heater for controlling the electric heater and causing said valve member to move to closed position in response to a predetermined temperature condition at said remotely disposed thermostat.

7. A fluid fuel feed valve comprising a valve casing, a valve movable in said casing, a thermostat disposed in said casing for actuating said valve, said valve casing being exposed to temperature conditions in response to which said valve is to be operated, and an electrical heater associated with said thermostat for exercising on said thermostat a control action supplemental to the control action of the surroundings.

8. In a fluid fuel feed valve, a thermostat element exposed to surroundings the temperature of which is to be controlled, a mechanical operating connection between the thermostatic element and the valve, and a thermostat disposed in a space remote from said thermostatic element for superimposing on the latter an additional temperature variation independent of the temperature of the surroundings.

9. In a fluid fuel control system, a fluid flow control valve, a thermostatic element exposed to surroundings the temperature of which is to be controlled, a mechanical operating connection between the thermostatic element and the valve for opening and closing the same by the action of the thermostatic element, a second thermostat disposed in a space remote from said first mentioned thermostatic element, and means controlled by said second thermostat for generating in proximity to said first thermostatic element heat to exercise thereon a control action supplemental to the control action of the surroundings.

10. In a fluid fuel control system, a fluid fuel control valve, a first thermostatic element exposed to surroundings the temperature of which is to be controlled, an operating connection between said first thermostatic element and said valve for operating the latter, a second thermostatic element, and means for generating heat in proximity to said first thermostatic element in response to the action of said second thermostatic element.

11. In a fluid fuel control system, a fuel valve, a thermostat element for continuously controlling the action of said valve to maintain predetermined temperature conditions, and a supplemental heating element adjacent said thermostat for varying the range of the continuous control action of said thermostat element.

12. In a fluid fuel control system, a valve, a thermostat element exposed to surroundings the temperature of which is to be controlled, an operating connection between said thermostat element and the valve for controlling the opening thereof to vary the fuel supply in response to the temperature adjacent to said thermostat, and remotely controlled means for generating heat adjacent to said thermostat element to vary the range of the regulating action of said thermostat.

13. In a fluid fuel control system, a valve, a thermostat disposed adjacent to said valve and exposed to surroundings the temperature of which is to be controlled for exercising a controlling action over a predetermined temperature range, an operating connection between said thermostat and said valve to vary the fuel flow for maintaining predetermined temperature conditions in the surroundings of said thermostat, the action of said thermostat tending to maintain a temperature determined solely by the characteristics of said thermostat, and means for generating heat adjacent to said thermostat independently of the surrounding temperature for shifting the regulating action of said thermostat to a different temperature range.

14. In a fluid fuel control system, a fluid fuel heater having a heated space, a fuel valve for said heater comprising a valve casing, a valve member mounted in said valve casing for controlling the fuel flow in said heater, a thermostat casing communicating with said valve casing, said thermostat casing being exposed to the heated space of said heater, a thermostat element in said thermostat casing, a mechanical connection between said thermostat element and said valve to cause continuous regulation of the opening thereof for maintaining a predetermined temperature in the heated space of said heater, the regulating action of said thermostat element depending on its natural characteristics and being arranged to maintain a predetermined temperature, and means for supplementally electrically heating the space adjacent to said thermostat element to vary the range of its continuous regulating action.

15. In a fluid feed valve control mechanism, a valve casing having an inlet and outlet, a valve in the casing movable to open and closed position to control the flow of fluid, a bi-metallic thermostat disposed within the valve casing, a mechanical connection between the thermostat and valve to move the valve in response to action of the thermostat, an electric heater within the valve casing arranged to vary the operating range of the thermostat.

16. In a heater system, fuel feed means, a bi-metallic thermostat connected to said fuel feed means to control the flow of fuel in said heater system, electrical heating means adjacent said thermostat for controlling the operating range of the thermostat, a second remotely positioned thermostat for controlling the generation of heat in said electrical heating means, and additional means for intermittently producing heat in said electrical heating means in response to variation of the second thermostat.

17. Apparatus of the class described comprising in combination a temperature responsive element, a portion of said element being subjected to a medium the temperature of which is to be controlled, and temperature responsive means controlling the temperature of another portion of said element and responsive to another temperature to be controlled.

18. Apparatus of the class described comprising in combination a temperature responsive element, means for subjecting said element to a temperature to be controlled, and independently acting temperature controlling means acting on said element.

19. Apparatus of the class described comprising in combination a temperature responsive element, a portion of said element being subjected to a medium the temperature of which is to be controlled, and heating means acting on another portion of said element and controlled by means subjected to a second medium whose temperature is to be controlled.

20. Apparatus of the class described comprising in combination a temperature responsive element, a portion of said element being subjected to a medium the temperature of which is to be controlled, and heating means surrounding another portion of said element and actuated by the rise and fall of a second temperature to be controlled.

21. A heating system comprising a heater, a thermostat, a portion of said thermostat being subjected to the temperature within said heater, an electric heating element adjacent another portion of said thermostat, thermostatic switch means in circuit with said heating element, said means being subjected to a temperature without said heater, and means operated by said thermostat for controlling said heater.

22. In a fluid heater control system, a bi-metallic temperature responsive element, means for subjecting the said element to a temperature to be controlled, and independent heating means acting on said element, said first-mentioned means and the heating means being relatively more directly effective on separate portions of the bi-metallic element.

23. In a heater control system, a bi-metallic temperature responsive element subjected to a medium the temperature of which is to be controlled, and heating means acting on a portion of said bi-metallic element and controlled by means subjected to a second medium whose temperature is to be controlled, said heating means and first-mentioned medium acting respectively more directly on separate portions of the bi-metallic element.

In testimony whereof I have hereunto subscribed my name.

HOWARD I. PIATT.